United States Patent [19]

Braski et al.

[11] Patent Number: 4,879,721

[45] Date of Patent: Nov. 7, 1989

[54] PHASE LOCKED LASER ARRAY

[75] Inventors: Michael T. Braski; Charles H. Wissman, both of Carlsbad; Richard A. Tilton, San Diego; Paul F. Robusto, Carlsbad, all of Calif.

[73] Assignee: Hughes Aircraft Company, Los Angeles, Calif.

[21] Appl. No.: 274,117

[22] Filed: Nov. 21, 1988

[51] Int. Cl.[4] ............................................. H01S 3/098
[52] U.S. Cl. ...................................... 372/18; 372/64; 372/99; 372/108
[58] Field of Search ....................... 372/64, 87, 82, 97, 372/99, 108

[56] References Cited

U.S. PATENT DOCUMENTS

| | | | |
|---|---|---|---|
| 4,103,255 | 7/1978 | Schlossberg | 331/94.5 |
| 4,129,836 | 12/1978 | Papayoanou | 331/94.5 |
| 4,169,251 | 9/1979 | Laakmann | 331/94.5 |
| 4,241,319 | 12/1980 | Papayoanou | 331/94.5 |
| 4,429,398 | 1/1984 | Chenausky et al. | 372/64 |
| 4,464,758 | 8/1984 | Chenausky et al. | 372/11 |
| 4,577,323 | 3/1986 | Newman et al. | 372/64 |
| 4,688,228 | 8/1987 | Newman et al. | 372/64 |
| 4,719,640 | 1/1988 | Chenausky et al. | 372/97 |
| 4,751,715 | 6/1988 | Henderson | 372/64 |
| 4,779,285 | 10/1988 | Henderson | 372/64 |

OTHER PUBLICATIONS

Newman, L. A. et al., "Coupled High Power Waveguide Laser Research;" Technical Report dated Jul. 30, 1985, distributed by Defense Technical Information Center, No. AD-A159 079, 57 pages.
Yu. E. Matizen and Yu. V. Troitskii, "Formation of non-Gaussian Light Beams in a Laser with an Exit Mirror Characterized by a Smooth Amplitude Inhomogeneity;" Sov. J. Quantum Electron, 16, Jul. 1986, pp. 941-944.

Primary Examiner—Léon Scott, Jr.
Attorney, Agent, or Firm—Joseph E. Szabo; Wanda K. Denson-Low

[57] ABSTRACT

A laser array having effectively separate oscillation regions 70,72,74 that are locked in phase is formed with a ceramic body 60,64 having a single, unpartitioned and relatively wide cavity area 62. Effectively isolated separate side by side laser oscillation regions 70,72,74 within the cavity are provided by use of common reflector optics 66,68 on the respective ends of the common cavity, 62 with one of the end optic arrangements comprising a common substrate 100 provided with several separate areas 102,104,106 of high reflectivity, mutually spaced from one another by areas of relatively low reflectivity. Individual control of the several separate regions of laser energy oscillations is provided by employing a separate pair of exciting electrodes 76,78,82,84,88,90 for each such region and applying separate RF exciting signals to the separate pairs respectively. In a large array, whether using plural isolated regions of laser oscillations in a common cavity or plural bores 121,122,123,124,125 separated by intra-cavity partiitons 126,127,128,129, adjustment of exciting power 150,154 to the outer electrode pairs 134,135,142,143 provides frequency correction for distortion and phase de-locking due to transverse thermal gradients.

12 Claims, 3 Drawing Sheets

BEAM WIDTH

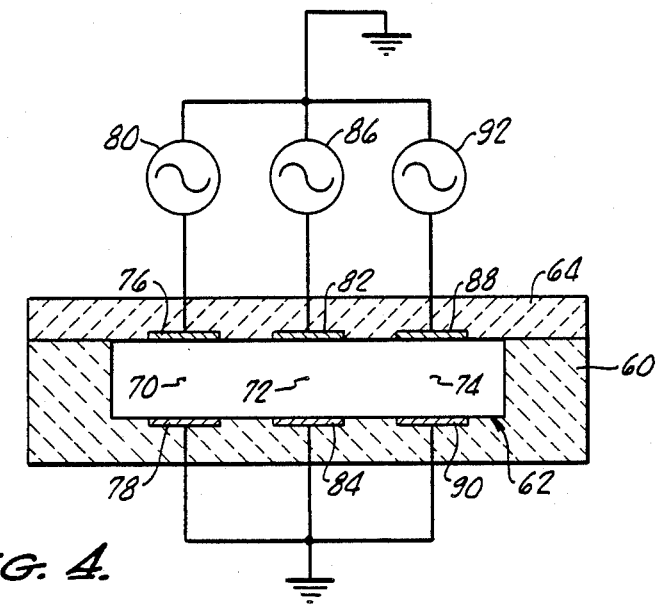
_FIG. 4._
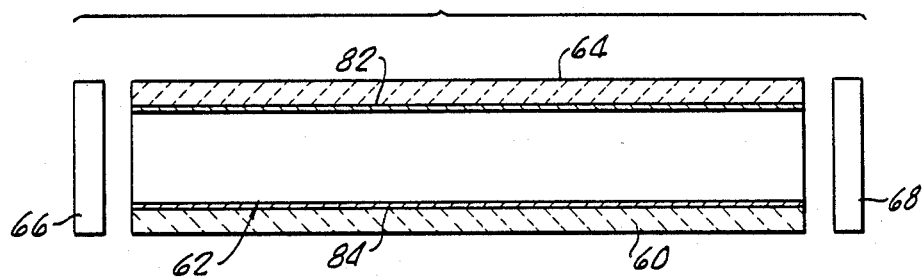
_FIG. 5._

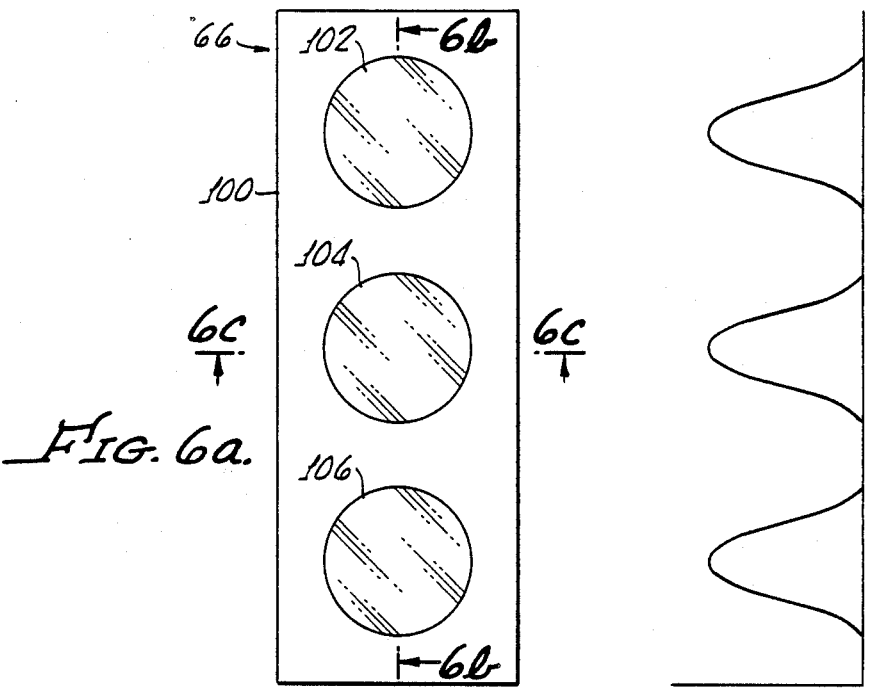
FIG. 6a.
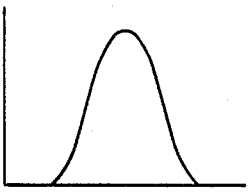
FIG. 6c.
FIG. 6b.
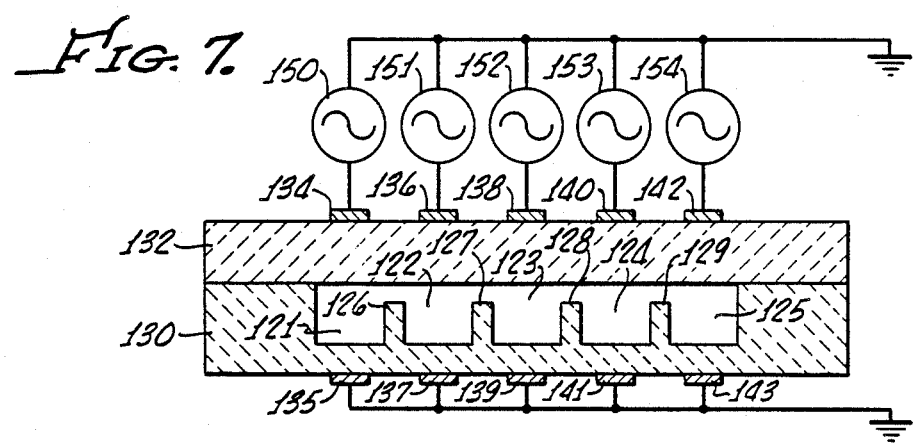
FIG. 7.

PHASE LOCKED LASER ARRAY

BACKGROUND OF THE INVENTION

1. Field of the Invention

The present invention relates to phase locked laser arrays, and more particularly concerns such an array having improved and simplified construction and improved control.

2. Description of Related Art

Multiple cavity waveguide lasers have a number of advantages in the desired goal of achieving small size, high power and light weight laser systems. Combining laser energy from multiple cavities not only may provide increased power for length of the laser, but enables delivery of a laser beam of greatly increased intensity. A multiple cavity clustered waveguide laser is described in a co-pending application of Alan R. Henderson for Clustered Waveguide Laser, Ser. No. 913,829, filed Sept. 30, 1986, and assigned to the assignee of the present application. The disclosure of this application of Henderson is incorporated herein by this reference, as though fully set forth.

Other waveguide lasers are disclosed in the following U.S. Patents: U.S. Pat. Nos. 4,577,323 to Newman et al, 4,103,255 to Schlossberg, 4,464,758 to Chenausky et al, 4,429,398 to Chenausky et al, 4,169,251 to Laakmann, and 4,129,836 to Papayoanou.

A type of multiple cavity waveguide laser which has sometimes been termed a "ridge waveguide laser" has been developed for phased locked arrays of coupled waveguide lasers. Such a ridge waveguide laser is described in detail in a Final Report dated July 30, 1985 entitled "Coupled High Power Waveguide Laser Research" prepared by L. A. Newman, A. J. Cantor, R. A. Hart, J. T. Kennedy and A. J. DeMaria and describing work performed under Air Force Contract F49620-84-C-0062. This is an unclassified Technical Report distributed by the Defense Logistics Agency of the Defense Technical Information Center. The waveguide laser array of the Newman et al Report employs far field interference of a number of phase locked waveguide lasers to provide a highly directional high power laser output. Such a system can deliver an intensity on target that is equal to the product of the single bore intensity and the square of the number of bores. Thus the resulting beam provides high power in a narrow beam footprint, or, effectively, greatly increased beam intensity. Phase locking of the energy oscillations in the several separate bores of the array of Newman et al is provided by optical coupling of laser energy through a gap at ends of very thin ceramic webs that are employed to divide the laser cavity into several separate but mutually coupled bores. The array of Newman et al is costly to manufacture because of the difficulty of grinding the ceramic body and the extreme fragility of the very thin dividing webs.

Where arrays of five or more adjacent bores are employed in the "ridge waveguide laser", thus resulting in a laser body of increased width, heat generated in the center of the body is dissipated more slowly than heat generated at outer portions of the body, and there is created a large transverse thermal gradient across the array. The thermal gradient produces different effective lengths of outer and inner bores of the array. Higher temperature produces lower gas density, lower gain and lower index of refraction. This causes the lasers of the respective bores of the array to operate at different frequencies, effectively de-locking the phased array, and thus preventing the desired phase locked operation of all the bores.

Accordingly, it is an object of the present invention to provide a phase locked laser array that avoids or minimizes above-mentioned problems.

SUMMARY OF THE INVENTION

In carrying out principles of the present invention in accordance with a preferred embodiment thereof, a waveguide laser array in which a lasing medium is confined within a common cavity of a laser body is provided with first and second pairs of electrodes disposed on opposite sides of the cavity, extending substantially the length of the cavity, with the electrodes of one pair being adjacent the electrodes of the other pair. First and second radio frequency exciting power sources are provided for exciting the first and second pairs of electrodes respectively. According to a feature of the invention, laser energy oscillations are produced between laser cavity end reflectors in effectively isolated separate laser oscillation regions of the cavity. In one arrangement, separate side by side regions of energy oscillations in a common cavity are provided by forming one of the reflectors with a substrate common to all energy oscillation regions and having an area of relatively high reflectivity for each such separate region, which areas of high reflectivity are mutually separated by areas of relatively low reflectivity. Separate sets of RF exciting electrodes are provided for at least some of the separate regions, and individually controllable RF exciting signals are applied to the respective sets.

According to another feature of the invention, where the separate and relatively isolated regions of energy oscillations are produced in part by a plurality of ridges or partitions extending longitudinally for the full length of the cavity and transversely almost entirely across the depth of the cavity, phase locking of the oscillations in all regions of energy oscillation is maintained by separate and independent control of amplitude of separate RF exciting signal applied to different pairs of the exciting electrodes.

BRIEF DESCRIPTION OF THE DRAWINGS

In the accompanying drawings:

FIG. 4 is a transverse cross section showing a phase locked waveguide laser array embodying principles of the present invention;

FIG. 5 is a longitudinal sectional view of the waveguide laser array of FIG. 4;

FIGS. 6a, 6b and 6c illustrate an optical reflector for the common three-region cavity; and FIG. 7 illustrates application of principles of the invention to a large ridge waveguide laser array to prevent thermal gradient de-locking.

DESCRIPTION OF THE PREFERRED EMBODIMENT

Figure 1:
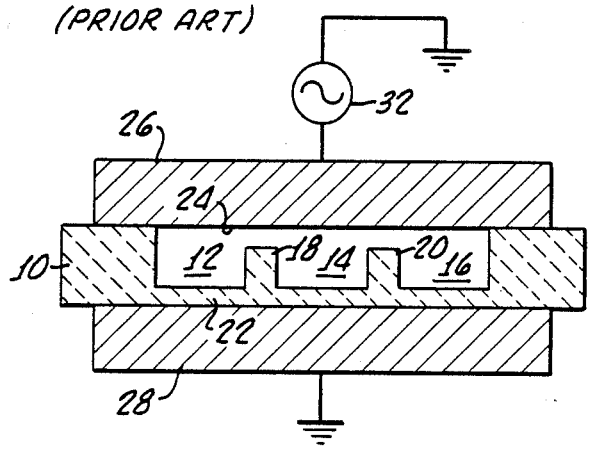
FIG. 1 is a cross section of a ridge waveguide providing a phase locked array of coupled waveguide lasers of the prior art.

A coupled ridge waveguide array providing three phase locked waveguide lasers of the type described by the above-identified Technical Report of Newman et al, is illustrated in FIG. 1 as comprising a laser body made of an elongated dielectric ceramic block 10 in which three side by side generally rectangular cross section cavities 12,14,16 have been ground, leaving very thin separating webs or partitions 18,20 integral with a bottom wall 22 of the ceramic block 10. Webs 18,20 extend transversely of the block 22 toward but slightly spaced from a surface 24 of a metallic electrode 26. Electrode 26 spans almost the entire width of the ceramic body 10, covering all three of the cavities. Electrode 26 provides a common electrode, being formed of a suitable electrically conductive material, and extends for substantially the full length of the elongated body 10. A second electrode 28 is secured to the lower surface of ceramic block 10 and forms a second longitudinally extending common electrode. The two electrodes are connected to a radio frequency power exciting source 32, having one side connected to electrode 26 and the other side connected to ground, to which the electrode 28 is also connected. The small space between the free ends of partitions 18,20 and the inner surface 24 of the electrode form small gaps or coupling passages between adjacent laser bores 12,14, and 16 to enable intercoupling of the energy oscillations of the several lasers. Thus phase locking is able to ensure that the three lasers operate with the same phase and amplitude.

Figure 2:
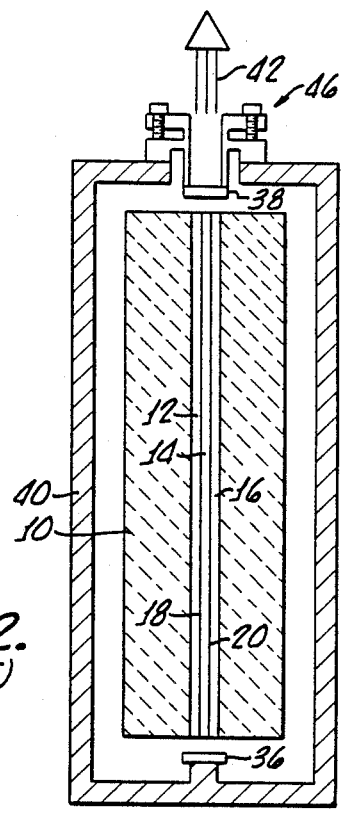
FIG. 2 is a longitudinal section of the prior art waveguide laser array of FIG. 1.

Lasing of the array of FIG. 1 is energized by the single pair of RF excited electrodes 26,28, causing energy oscillations within each of the three cavities between common end reflectors 36 and 38 (FIG. 2) at opposite ends of the cavities. As shown in FIG. 2, ceramic block 10 is mounted in a laser housing 40 to which the reflective optics are also mounted. Reflector 36 is a total reflector and may be mounted for a small amount of longitudinal adjustment (not shown) to effectively control length of the cavities. Reflector 38, of course, has a small amount of transmissivity to enabled projection of the three laser beams in the direction of arrow 42. Webs 18,20 are very thin, and shown of enlarged width in FIG. 1, for ease of illustration.

The common optics or reflectors 36,38, common to all three lasers, are properly aligned to ensure that all lasers operate at the same free space cavity length. As mentioned above, the gaps between the ends of partitions 18,20 and the inner surface of electrode 26 provide the necessary coupling to promote laser energy oscillations in each of the three cavities at the same polarization and phase. Alignment of the common reflector 38 is provided by the screw mounting arrangement generally indicated at 46 in FIG. 2.

Figure 3:
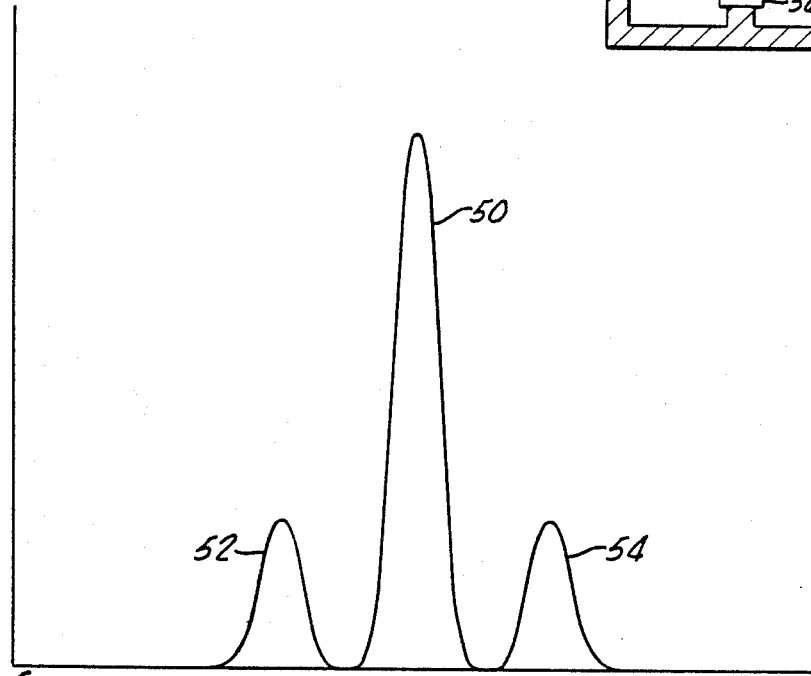
FIG. 3 shows a profile of the far field beam of the three laser phased array of FIGS. 1 and 2.

Because of far field interference, the far field pattern of the multiple laser array of FIGS. 1 and 2 has a cross section generally of the configuration illustrated in FIG. 3, showing a very high intensity and relatively narrow center lobe 50, having low intensity side lobes 52,54. A significant advantage of the multiple laser phase locked array of FIGS. 1 and 2 is the generation of the far field pattern, the configuration illustrated in FIG. 3, having a high intensity narrow beam width. In general, as compared to a single laser of comparable dimensions, the three laser phase locked array will provide a far field pattern of the same power but of approximately one quarter the spatial extent, thereby providing increased beam intensity.

The phase locked waveguide array of FIGS. 1 through 3 is expensive and difficult to manufacture, largely because of the difficulties of fabricating the very thin webs of the ceramic laser body. Preferably these webs are very thin, in the order of 1/100th of an inch (0.010) so that s manufacture of the waveguide ceramic block having such thin, brittle webs is a particularly difficult operation. Another disadvantage of the phase locked coupled array of FIGS. 1 through 3 is that as the number of lasers becomes larger, that is, with a larger array having four, five or more lasers, phase lock is not feasible because of thermally induced transverse gradients which cause disparities in the relative indices of refraction of the laser medium confined within the respective cavities. The laser medium in such an array is most commonly a mixture of carbon dioxide, either nitrogen or carbon monoxide, helium and, usually, xenon.

FIGS. 4 and 5 illustrate, in transverse and longitudinal section, respectively, a three laser phase locked array that operates substantially in the same manner as the array of Newman, et al illustrated in FIGS. 1 through 3, and, moreover, will provide a far field beam pattern of substantially similar high intensity and narrow beam width. The phase locked laser array of FIGS. 4 and 5 embodies principles of the present invention.

Basically, a laser constructed according to one feature of the present invention includes a laser body formed of a ceramic block 60, having a single, common full width cavity 62 unobstructed by any partitions. The ceramic block 60 of the laser body has its cavity closed and sealed by a full width ceramic cover block 64 that cooperates with the block 60 to define the cavity 62 in which is confined a conventional lasing medium of, for example, the mixture described above. The transverse cross sectional dimension of the cavity 62 is divided into three imaginary equal width areas, each of which will provide an isolated, substantially separate region of laser energy oscillation along the length of the cavity between end reflectors generally indicated at 66 and 68 in FIG. 5. The three laser cavity regions of the cavity 62 (which are analogous to separate laser "bores") are designated in the drawings as centered about points 70,72 and 74, respectively. On opposite sides of cavity region 70, preferably within the cavity, are mounted electrodes 76,78 of a first pair, connected to be energized by a first radio frequency power source 80. On opposite sides of the second cavity region 72 are mounted electrodes 82,84 of a second pair of electrodes, connected to be energized by a second radio frequency power source 86. On opposite sides of the third cavity region 74 are mounted electrodes 88,90 of a third electrode pair connected to be energized by a third radio frequency power source 92. As can be seen in FIG. 5, the electrodes of each pair extend for substantially the full length of the laser body and therefore for nearly the full length of the cavities.

In order to support substantially separate, isolated laser energy oscillating regions within the cavity, one of the reflectors 66,68, such as, for example, total end reflector 66 (output reflector 68 is partially transmissive), is formed with three areas of relatively high reflectivity separated by areas of relatively low reflectivity, with each area of high reflectivity being aligned with a respective one of the cavity regions or separate "bores" 70,72,74. This arrangement of reflective regions is shown in FIGS. 6a, 6b and 6c. Thus, as shown in FIG. 6a, a non-reflective, opaque substrate 100 is provided with three mutually spaced separate reflective areas 102,104,106 which are coated on the opaque and non-reflective substrate by any suitable means. Methods and apparatus for providing coated areas of variable reflectivity on a substrate that may be employed in the practice of the present invention are described in a co-pending application of P. F. Robusto, D. D. Scofield, C. H. Wang and J. C. Hamacher for Method of Tapering Reflectivity of Optical Elements, Ser. No. 246,709, filed Sept. 20, 1988, and assigned to the assignee of the present invention. The disclosure of this application of Robusto et al is incorporated by this reference as though fully set forth herein. An article in the Soviet Journal of Quantum Electronics, July 1986, entitled "Formation of non-Gausian light beams in a laser with an exit mirror characterized by a smooth amplitude inhomogeneity" by Yu. E. Matizen and Yu. V. Troitskii also describes apparatus and methods for providing mirrors of smoothly varying reflectivity. This article describes fabrication of such mirrors by an evaporation process. According to techniques of the above-identified patent application, a uniform reflective coating of the desired area is deposited upon the substrate and then, areas of the reflective coating are ground off to provide the desired reflectivity profile variations.

Those portions of substrate 100 outside of the circular areas 102,104, and 106 of FIG. 6a have substantially no reflectivity (and are also opaque). Portions of the substrate 100 within the circular areas 102, 104 and 106 are suitably coated so as to be provided with a reflectivity that varies from a maximum at a central portion of the circular area to a minimum at the periphery of the circular area, varying equally in all directions from the center of the circular areas. The omni-directional pattern of reflectivity variation is illustrated by the two curves of FIGS. 6b and 6c. A profile of reflectivity variation along the substrate width (vertical dimension as viewed in FIGS. 6a and 6b) is illustrated in FIG. 6b, wherein the abscissa indicates reflectivity (of a section on lines B—B of FIG. 6a) increasing toward the left, and the ordinate indicates position along the width (vertical dimension of FIG. 6b) of the substrate. It can be seen that the reflectivity variation is basically that of a Gaussian curve, having a peak corresponding to the center of the area of reflectivity and falling off to substantially zero reflectivity at the periphery of each circular reflective area.

Similarly, the profile of FIG. 6c, having an abscissa that corresponds to height (horizontal dimension as viewed in FIG. 6a) of the reflective substrate 100 and having an ordinate representing magnitude of reflectivity of a section taken through the center of reflective area 104, as, for example, on lines C—C, indicates that in the transverse direction the reflectivity variation is also Gaussian. Although the reflectivity variation of each of the reflective areas is illustrated as Gaussian, and such variation is presently preferred, other variations or reflectivity profiles may be employed to provide oscillation or feedback appropriate to a selected laser mode.

The centers of each of the reflective areas 102, 104, and 106 correspond to and are aligned with the centers of the respective regions 70, 72, and 74. Center to center separation of the reflective areas must be optimized to ensure independent modes and to maintain adequate coupling between adjacent lasing regions for phase locked operation. For example, in a carbon dioxide waveguide laser having separate laser regions of approximately 2 mils×2 mils, phase locking is optimized in the arrangement of FIGS. 4 and 5 for a center to center separation of the reflective areas 102, 104 and 106 of between 2.0 mils and 4.0 mils. Specific separation within this range depends on gas pressure and input power from the RF exciting sources.

The frequencies of all three RF sources are identical. Nominally, amplitudes of the RF exciting signals are also identical. Nevertheless, thermal gradient induced frequency shifting may result from varying temperature. It is caused by the fact that higher temperature produces lower density of the lasing medium, lower gain, and lower index of refraction. With a lower index of refraction, the frequency is shifted, and thus there may be a temperature induced frequency shift, which disturbs phase locking. A frequency control system is needed to maintain phase lock in the presence of temperature variation. A simplified technique for frequency control, useful in the present invention, is described in a co-pending application, Ser. No. 220,632, filed July 18, 1988, for Laser Frequency Control, of Charles H. Wissman and Michael T. Braski, assigned to the assignee of the present application. The disclosure of this application of Wissman and Braski is incorporated by this reference as though fully set forth herein. As taught by the co-pending application of Wissman and Braski, control of amplitude of the RF exciting signal will vary frequency of the laser energy oscillations. Thus, adjusting input power to the electrode pairs can produce a change in effective cavity length of the individual lasing region 70, 72 or 74 respectively, thus varying frequency and providing a convenient control for maintaining phase locked operation. For example, as described in further detailing the above-identified copending application of Wissman and Braski, a three percent change in the input power of an eight inch carbon dioxide waveguide laser produces a 10 MHz frequency shift with no detectable reduction in laser efficiency or output power. Thus, should transverse thermal gradients of the waveguide laser array of FIGS. 4 and 5 produce different effective lengths in the several lasing regions 70, 72, 74, tending to change frequencies of respective lasing regions and thus interfering with the desired phase locking, one can adjust amplitudes of the two outer region RF power sources 80,92 relative to the amplitude of inner region power source 86. By this technique individual frequencies of the two outer lasing regions are readily controlled to maintain proper phase locking, even in the presence of disturbed phase locking due to transverse thermal gradients or other factors.

The above described arrangement for compensating for temperature gradient induced frequency shift and consequent de-locking of the lasers of the array is of much greater significance in larger arrays, arrays having four, five or more side by side lasers. In fact, in a prior laser array having as many as five adjacent lasers, it may be impossible to maintain or ensure phase locked operation in the presence of commonly experienced transverse thermal gradients. However, use of plural pairs of exciting electrodes, each having its individually controllable RF exciting power source, can overcome this problem and ensure phase locked operation within acceptable input power variations.

FIG. 7 shows a transverse section of a ridge waveguide laser, like that of the Newman et al Final Report, but having five separate lasers. The phase locked laser array of FIG. 7 employs five side by side lasing regions or bores 121, 122, 123, 124, and 125, separated by partitions or webs 126, 127, 128, and 129 extending from the lower inner surface of a ceramic block 130 forming part of the laser body toward but slightly spaced from the inner surface of a ceramic cover 132 that completes and seals the laser cavities. Instead of a single common pair of electrodes for all bores, five pairs of metallic electrodes 134,135, 136,137, 138,139, 140,141, and 142,143 are positioned at opposite sides of the respective lasing regions 121 through 125 and connected respectively to five independent and independently adjustable RF power sources 150 through 154. If deemed necessary or desirable, the electrodes may be positioned within the laser cavities, as indicated in FIG. 4.

In a large laser array such as is illustrated in FIG. 7, outer cavities or outermost lasing regions 121 and 125 may be cooler than the inner cavities or regions 122, 123 and 124, and thus tend to provide laser energy oscillations at frequencies different from the frequencies of the oscillations of the inner cavities. As previously described in connection with adjustment of RF oscillators of FIGS. 4 and 5, one can adjust input power to the outer electrode pairs 134,135 and 142,143 of the large laser array of FIG. 7, and thus change the effective cavity length of the two outer lasers, thereby correcting for thermal distortion.

The large laser array shown in section in FIG. 7 has common cavity end reflectors (not shown) substantially as shown for the three cavity prior art laser array of FIGS. 1 and 2. This array need not have separate mutually spaced reflective areas on either of its reflectors, because the webs 126 through 129 are effective to isolate the adjacent lasing regions. However, instead of providing a single pair of electrodes common to all five lasers, as in the prior art arrangement of FIGS. 1 and 2, the improved array of FIG. 7 provides five separate electrode pairs, each individually excited by a different one of the five separate and separately adjustable RF power sources to enable compensation for transverse thermal gradients. Thus, a large array can have its lasers phase locked, thereby extending advantages of a three laser phase locked array.

What is claimed is:

1. A waveguide laser array comprising:
   a laser body having a common, physically unpartitioned, cavity,
   a laser medium within the cavity,
   first and second reflectors secured to the body at opposite ends of the cavity, said first reflector including first and second areas of relatively high reflectivity spaced from one another by areas of relatively low reflectivity,
   a first set of electrode disposed on opposite sides of said cavity and extending substantially the length of the cavity,
   a second set of electrodes adjacent said first set, said second set being disposed on opposite sides of said cavity and extending substantially the full length of said cavity, and
   first and second RF exciting power sources connected to provide RF exciting signals to said first and second sets of electrodes respectively to produce laser energy oscillations of substantially the same frequency in functionally separate and isolated regions along the length of said cavity, said regions being aligned with respective ones of said areas of relatively high reflectivity.

2. The waveguide laser array of claim 4 wherein said first reflector extends across said cavity at one end thereof and wherein said first area has a reflectivity which decreases in a plurality of directions from a central point thereof.

3. The waveguide laser array of claim 1 wherein reflectivity of one of said areas varies over said area.

4. The waveguide laser array of claim 1 wherein reflectivity of one of said areas decreases from a maximum reflectivity at an inner point thereof to a minimum reflectivity at a plurality of outer points thereof.

5. The waveguide laser array of claim 1 wherein reflectivity of said first area has a Gaussian variation across said first area.

6. The waveguide laser array of claim 1 including a third set of electrodes adjacent said first and second sets, said third set of electrodes being disposed on opposite sides of said cavity and extending substantially the full length of said cavity, a third RF exciting power source coupled to said third set of electrodes, said first reflector having first, second and third areas of relatively high reflectivity mutually spaced by first and second areas of relatively low reflectivity, said areas of high reflectivity corresponding to said first, second and third sets of electrodes respectively, and being aligned with respective ones of said separate regions, whereby the array effectively produces laser energy oscillations in three separate regions along the length of the cavity.

7. A waveguide laser array comprising:
   a laser body having a common, physically unpartitioned cavity,
   a laser medium within the cavity,
   first and second reflectors secured to the body at opposite ends of the cavity, said first reflector comprising first and second areas of relatively high reflectivity separated from one another by an area of relatively low reflectivity, and
   means for exciting the laser medium in said cavity whereby separate regions of laser energy oscillations are produced between said second reflector and each of said areas of relatively high reflectivity of said first reflector as a result, at least partially, of the separation of said areas of relatively high reflectivity by said areas of relatively low reflectivity.

8. The waveguide laser array of claim 7 wherein said means for exciting the laser medium in said cavity comprises a first set of electrodes disposed on opposite sides of said cavity and extending between said second reflector and said first area of relatively high reflectivity, a second set of electrodes disposed on opposite sides of said cavity and extending adjacent said first set between said second reflector and said second area of high reflectivity, a first RF exciting power source connected to said first set of electrodes, and a second RF exciting power source connected to said second set of electrodes.

9. The waveguide laser array of claim 8 wherein said first reflector has a third area of high reflectivity separated from said first and second areas of high reflectivity by an area of low reflectivity and including a third set of electrodes disposed on opposite sides of said cavity and extending adjacent said first and second sets between the second reflector and said third area of reflectivity, and a third RF exciting power source connected to said third set of electrodes.

10. The waveguide laser array of claim 8 wherein reflectivity of one of said areas varies over said one area.

11. The waveguide laser array of claim 8 wherein reflectivity of one of said areas decreases from a maximum reflectivity at an inner point of said one area to a minimum reflectivity at a plurality of outer points of said one area.

12. The waveguide laser array of claim 8 wherein reflectivity of said first area has a Gaussian variation across said first area.

* * * * *